US009721120B2

(12) United States Patent
McLachlan et al.

(10) Patent No.: US 9,721,120 B2
(45) Date of Patent: Aug. 1, 2017

(54) PREVENTING UNAUTHORIZED CALLS TO A PROTECTED FUNCTION

(71) Applicant: Apple Inc., Cupertino, CA (US)

(72) Inventors: Jon McLachlan, San Francisco, CA (US); Julien Lerouge, San Jose, CA (US); Daniel F. Reynaud, San Jose, CA (US); Eric D. Laspe, San Jose, CA (US)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 13/893,463

(22) Filed: May 14, 2013

(65) Prior Publication Data

US 2014/0344924 A1    Nov. 20, 2014

(51) Int. Cl.
| | | |
|---|---|---|
| G06F 11/00 | (2006.01) |
| G06F 12/14 | (2006.01) |
| G06F 12/16 | (2006.01) |
| G08B 23/00 | (2006.01) |
| G06F 21/62 | (2013.01) |
| G06F 21/12 | (2013.01) |

(52) U.S. Cl.
CPC .......... *G06F 21/629* (2013.01); *G06F 21/125* (2013.01)

(58) Field of Classification Search
CPC ...................................................... G06F 21/14
USPC ............................................. 726/29; 713/194
See application file for complete search history.

(56) References Cited

U.S. PATENT DOCUMENTS

| | | | |
|---|---|---|---|
| 6,163,882 A | 12/2000 | Masuyama et al. | |
| 7,181,603 B2 | 2/2007 | Rothrock et al. | |
| 8,286,251 B2 | 10/2012 | Eker et al. | |
| 8,302,210 B2* | 10/2012 | Myles et al. | 726/30 |
| 8,307,354 B2* | 11/2012 | Haga et al. | 717/159 |
| 8,312,297 B2* | 11/2012 | Sato et al. | 713/194 |
| 8,752,032 B2* | 6/2014 | Johnson et al. | 717/136 |
| 8,776,216 B2* | 7/2014 | Boccon-Gibod et al. | 726/21 |
| 2002/0013907 A1 | 1/2002 | May | |
| 2007/0169068 A1 | 7/2007 | Kanazawa et al. | |

(Continued)

FOREIGN PATENT DOCUMENTS

WO    2008/074483 A1    6/2008

OTHER PUBLICATIONS

N. Cohen, "Enforcing function call order in C++", The Code Project, Sep. 29, 2003, p. 1-8, Accessed on Mar. 5, 2012, [http://www.codeproject.com/Articles/5086/Enforce-function-call-order-in-C?display=Print].

(Continued)

*Primary Examiner* — Taghi Arani
*Assistant Examiner* — Khalil Naghdali
(74) *Attorney, Agent, or Firm* — Blakely, Sokoloff, Taylor & Zafman LLP

(57) ABSTRACT

An obfuscated program can be configured to resist attacks in which an attacker directly calls a non-entry function by verifying that an execution path to the function is an authorized execution path. To detect an unauthorized execution order, a secret value is embedded in each function along an authorized execution path. At runtime, the secrets are combined to generate a runtime representation of the execution path, and the runtime representation is verified against an expected value. To perform the verification, a verification polynomial is evaluated using the runtime representation as input. A verification value result of zero means the execution path is an authorized execution path.

25 Claims, 11 Drawing Sheets

(56) References Cited

U.S. PATENT DOCUMENTS

| | | |
|---|---|---|
| 2007/0204257 A1 | 8/2007 | Kinno et al. |
| 2008/0215862 A1 | 9/2008 | Haga et al. |
| 2008/0250216 A1 | 10/2008 | Kershaw et al. |
| 2009/0077415 A1 | 3/2009 | Kay et al. |
| 2010/0125913 A1 | 5/2010 | Davenport et al. |
| 2010/0146624 A1 | 6/2010 | Meyer et al. |
| 2011/0088095 A1 | 4/2011 | Stewart et al. |
| 2012/0192283 A1 | 7/2012 | Gu et al. |
| 2013/0091571 A1 | 4/2013 | Lu |

OTHER PUBLICATIONS

Mircosoft, "What is a DLL", DecA, 2007, p. 2-7 Accessed on Mar. 7, 2012, [http://support.microsoft.com/kb/81565].

* cited by examiner

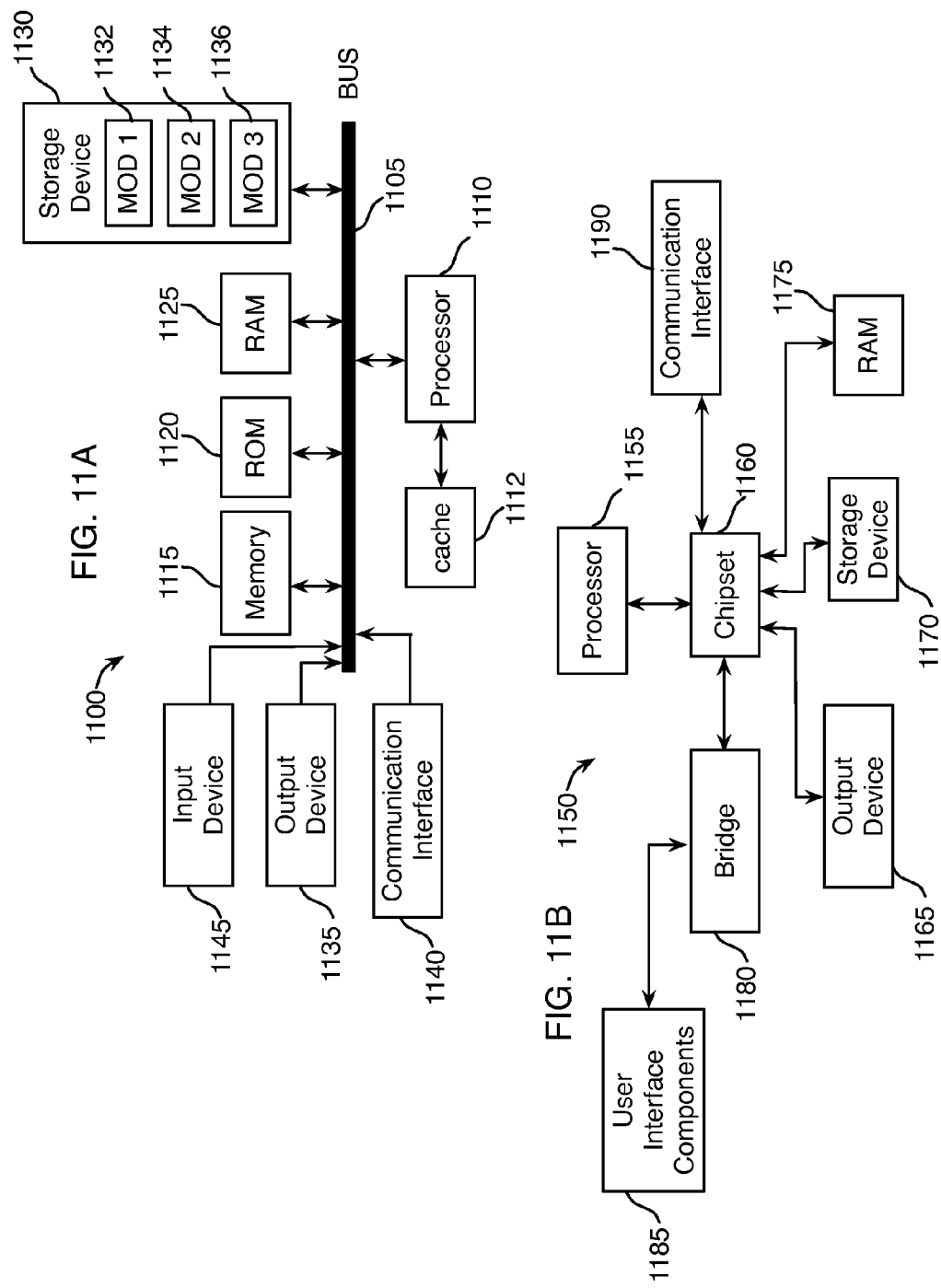

PREVENTING UNAUTHORIZED CALLS TO A PROTECTED FUNCTION

TECHNICAL FIELD

The present technology pertains to detecting unauthorized calls to software routines, and more specifically pertains to detecting direct calls into a function without calling the instructions that should be executed beforehand in a specific order.

BACKGROUND

Software developers invest considerable resources in the development and maintenance of computer software. This investment often results in the development of proprietary algorithms that are advantageous over those used by the competition and which the developer would like to keep secret so as to leverage the superiority of the algorithm. In addition to proprietary algorithms, software may also contain other embedded secrets such as cryptographic keys. Because of the plethora of important information, software is often the target of various reverse engineering efforts to dissect, analyze, and discover how it works.

One approach frequently used by attackers to minimize the reverse engineering effort is to lift whole sections, such as individual functions, from a program. For example, if a program includes a function to decrypt a song prior to playback, instead of reverse engineering the decryption function, the attacker could simply call the decryption function providing the proper input parameters. Because this type of attack can be used to bypass media protection technologies, such as digital rights management technologies, software developers have used a variety of code obfuscation and anti-tamper techniques to thwart these reverse engineering attacks. Unfortunately, previous techniques have suffered from a number of drawback including code bloat, architecture specific solutions, and lack of stealth.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting and reacting to unauthorized calls to software routines using a call path enforcement (CPE) obfuscation technique. The CPE technique can be applied to a program by an obfuscation tool, such as compiler, to produce a protected program. The CPE technique uses static information about a program's call structure to identify execution paths to a selected function. The CPE constructs a whitelist of authorized execution paths to the selected function based on the identified execution paths. The whitelist can include all identified execution paths, or can be limited to those execution paths with a path length less than or equal to a predefined maximum path length. In some cases, an execution path with a length greater than the predefined maximum can be truncated to the predefined maximum path length.

The CPE then uses the authorized execution paths to generate a verification polynomial. The verification polynomial can be generated by first assigning a secret value to each function on at least one authorized execution path. For each authorized execution path, the CPE generates a path representation by combining the assigned secret values. The CPE constructs the verification polynomial such that each authorized path representation is a root of the polynomial.

The CPE can then embed instructions throughout the program that ensure the functions in the program are executed according to one of the authorized execution orders. To ensure the functions are executed in an authorized order, the CPE can embed a secret in each function on an authorized execution path. The embedded secret value can be stored in a local variable that is pushed on the runtime stack during execution. At runtime, after a protected function is called, the embedded instructions can trace up the runtime stack to identify any secret values pushed onto the stack by previous functions in the execution path. The embedded instructions can combine the secrets to generate a representation for the runtime execution path to the protected function. The embedded instructions can combine the identified secret values using a same process as was used during the CPE obfuscation process. The embedded instructions can then verify that the runtime representation matches an authorized representation by evaluating the verification polynomial using the runtime representation at an input. If the verification fails, the program can be made to fail either immediately or at some later point in the execution. In some cases, the runtime verification value can be used to manipulate program data, or used in the execution of a callback function.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 11A and 11B illustrate exemplary system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a technique to detect and react to unauthorized calls to software routines. The disclosed call path enforcement (CPE) obfuscation technique uses static information about a program's control flow to identify acceptable execution paths to a selected function. The CPE can then use this information to embed a CPE verification mechanism that ensures the functions in the program are executed according to one of the predefined execution orders. If the CPE verification mechanism detects an unauthorized execution order, the CPE verification mechanism can cause the program to fail. To ensure the functions are executed in an authorized order, the obfuscation technique can embed a secret in each function along an execution path. At runtime, the CPE verification mechanism can combine the secrets and verify the runtime secret against an expected value. If the runtime secret fails to match the expected value, the program can be made to fail either immediately or at some later point in the execution.

Figure 1:
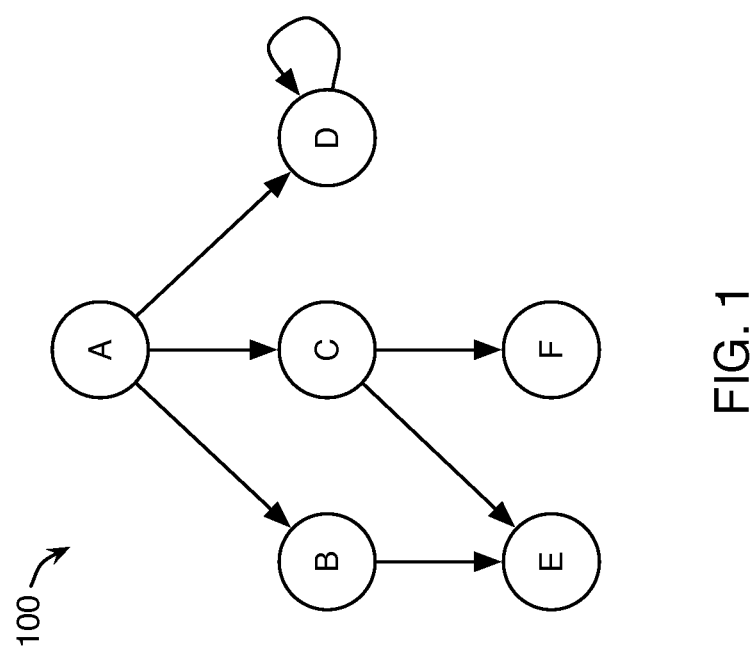
FIG. 1 illustrates an exemplary call graph.

To obtain the static information about a program, the CPE can construct a call graph. FIG. 1 illustrates exemplary call graph 100 for a simple function having six functions. Each node in call graph 100 represents a function in the program and each directed edge represents a call from a caller function (i.e., source node) to a callee function (i.e., destination node). A recursive function is represented in the graph using an edge that starts and ends at the same node. An execution path is an ordered sequence of one or more functions connected by an edge in the call graph. For example an execution path in call graph 100 can be the sequence of functions A, B, E.

Figure 2:
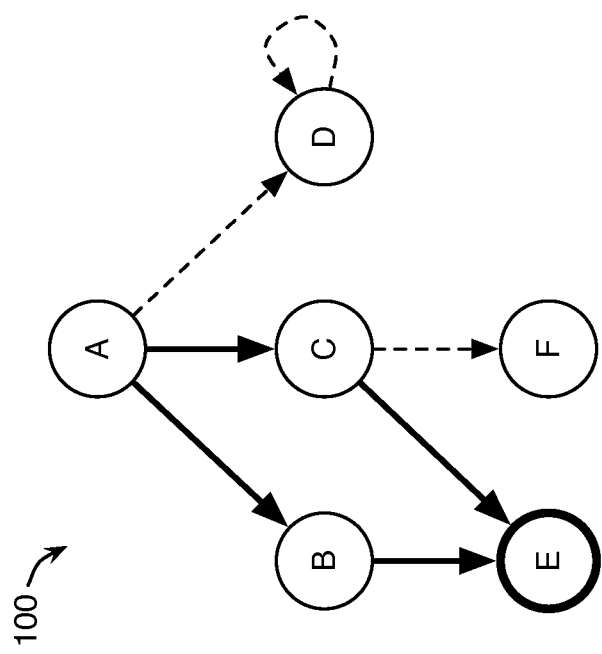
FIG. 2 illustrates an exemplary call graph with a designated protected function.

The CPE uses the call graph to identify execution paths to a selected function. The selected function can be a function a software developer wants to protect, such as a sensitive function or a function of significant importance in the program. FIG. 2 illustrates exemplary call graph 100 in which function E has been designated as a protected function. Based on this designation the CPE can identify the execution paths from a start node to the protected function. In this case, using call graph 100 the CPE can identify that the exemplary program includes two possible execution paths from the program entry to function E: (1) A, B, E and (2) A, C, E. The possible execution paths of A, B, E and A, C, E have been emphasized in call graph 100.

Figure 3:
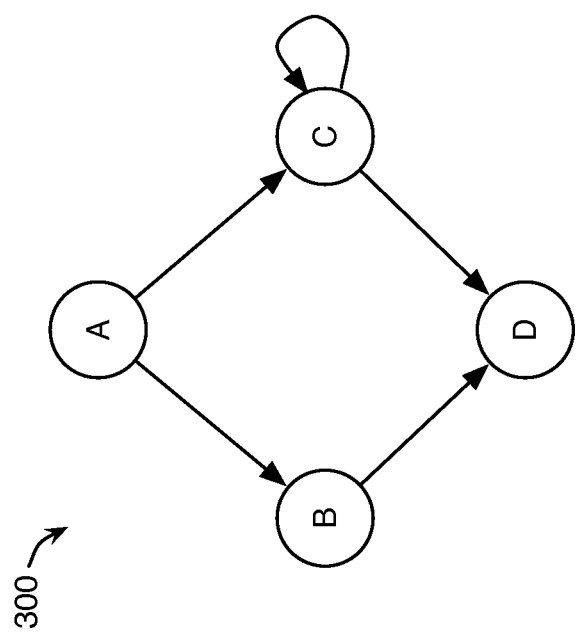
FIG. 3 illustrates an exemplary call graph with a recursive function.

Using the identified execution paths to the protected function, the CPE can construct a whitelist of authorized execution paths. The whitelist can include all of the identified execution paths. For example, based on call graph 100, the CPE could add the execution paths of A, B, E and A, C, E to the whitelist for protected function E. Alternatively, the whitelist can be restricted to only those execution paths with a path length less than or equal to a predefined maximum path length. For example, consider call graph 300 in FIG. 3, which includes a recursive function C and protected function D. Because the CPE uses static information to determine the possible call paths, it may not be possible to determine a maximum number of times C will execute. Therefore, the maximum path length from A to D, via C, may not be known. To address this unknown, the CPE can limit the length of a whitelisted path. For example, suppose the maximum path length is four. In this case, the CPE would whitelist four execution paths as authorized paths: (1) A, B, D; (2) A, C, D; (3) A, C, C, D; and (4) C, C, C, D. Note, that a truncated authorized path is measured backward from the protected function.

Figure 4:
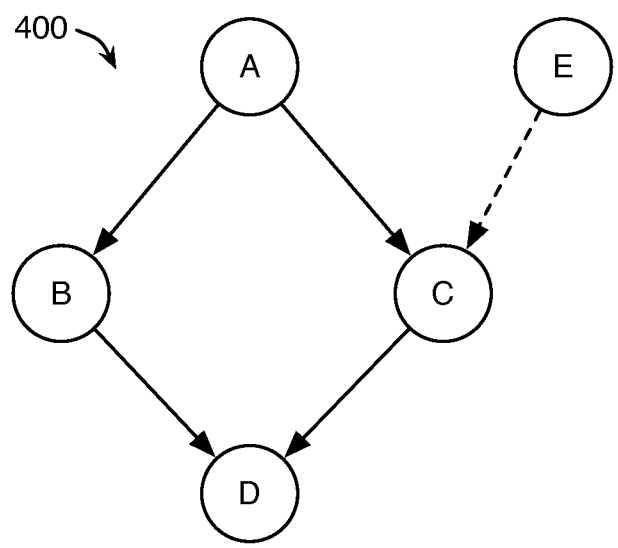
FIG. 4 illustrates an exemplary call graph modified to include a stub function.
Figure 4:
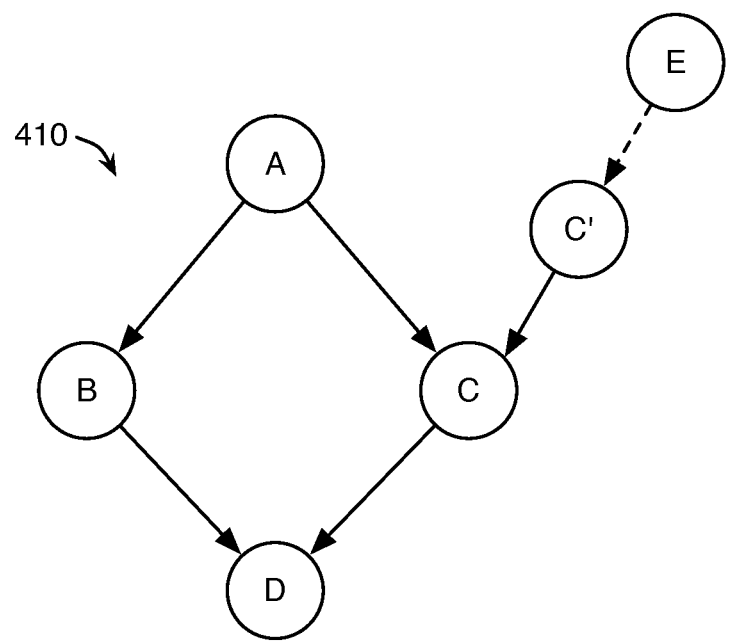

The CPE can be configured to exclude paths that include a function that has its address taken. These functions present a difficulty in that it may not be possible to determine a full call path. Alternatively, the CPE can insert a stub function, whose purpose is to call the original function. Then all references to the original function can be modified to refer to the stub function. This makes it possible for the CPE to treat the stub function as an entry point (or root) function, and identify all execution paths from the stub function to the protected function. For example, consider exemplary call graph 400 in FIG. 4, which includes function C that is called directly by A and indirectly by E. Using call graph 400, the CPE may not be able to identify the execution path of E, C, D. To address this issue, the CPE can insert a stub function C', which calls C. Then the reference originally used by E to call C can be modified to reference C'. Call graph 410 illustrates the new call graph including the stub function C'. Using call graph 410, the CPE can identify and whitelist three execution paths: (1) A, B, D; (2) A, C, D; and (3) C', C, D.

Figure 5:
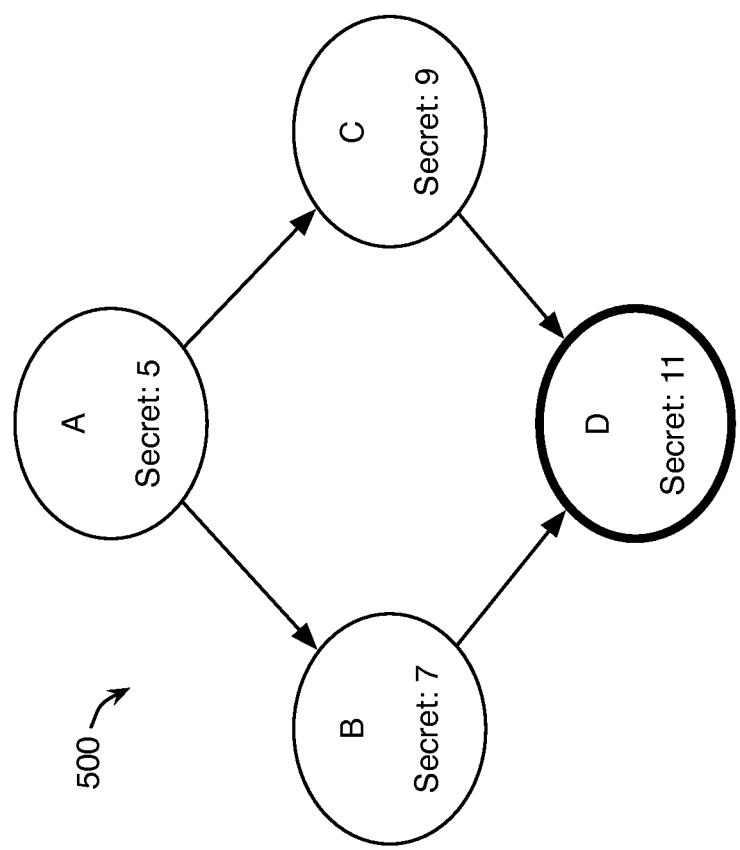
FIG. 5 illustrates exemplary call graph with protected function.

Once the CPE has identified the possible execution paths to a protected function and constructed a whitelist of authorized functions, the CPE can assign a secret to each function that appears on at least one authorized execution path. For example, the secret can be an integer value. The CPE can assign a unique or random secret value to each function. FIG. 5 illustrates exemplary call graph 500 with protected function D. In call graph 500 each function has been assigned a secret value, e.g., function A was assigned secret value 5.

In some embodiments, the CPE can select a secret value from a predefined set of secret values. In this case, the number of unique secret values can be less than the number of unique functions. That is, more than one function could be assigned the same secret value.

Figure 6:
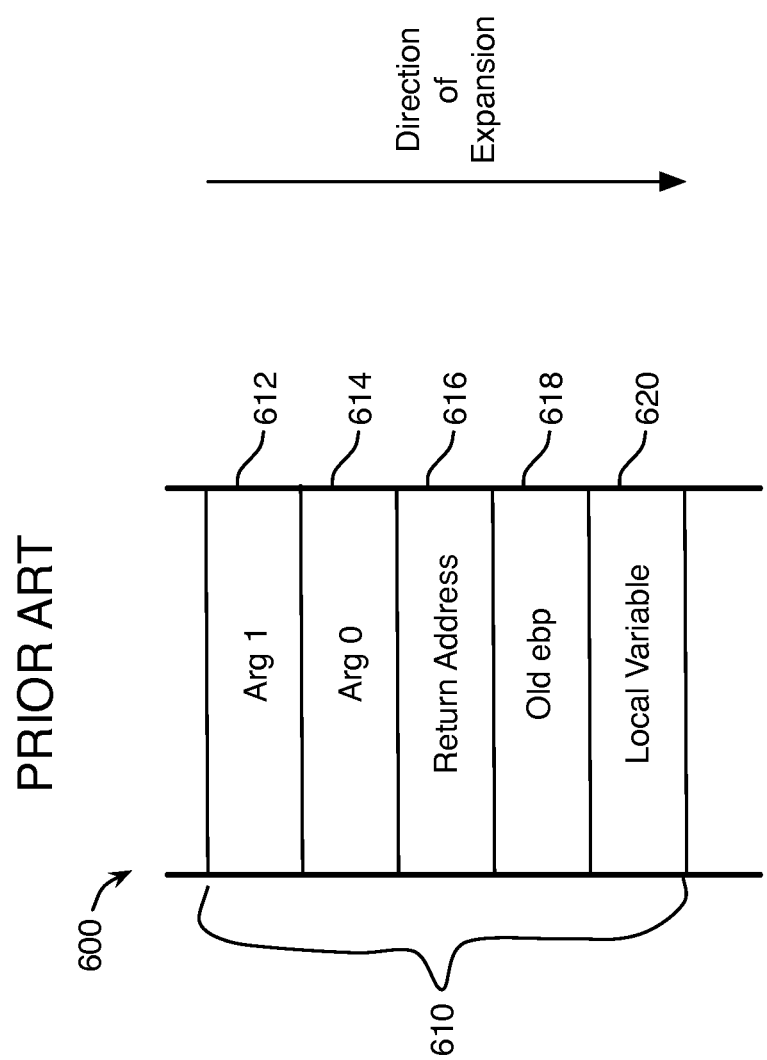
FIG. 6 illustrates exemplary prior art runtime stack.

The CPE can embed the secret values in the functions by assigning the values to a local variable inserted in the function. For example, the CPE could insert a local variable int secretData in function A and initialized the variable to 5, e.g., insert the instruction int secretData=5. The CPE can also use alternative local variable types, as discussed below. Because the secret value is stored in a local variable, when the function executes, the secret value is pushed onto the runtime stack. For example, FIG. 6 illustrates exemplary runtime stack 600 with a single stack frame. As a program executes, the program uses the runtime stack to maintain state. For example, when a function is called the runtime stack expands downward by adding a new stack frame for the function to the runtime stack. When that function completes, the stack frame is removed from the runtime stack. A stack frame can contain local variables, arguments, CPU register contents, return address, and other information for the function. Stack frame 610 contains arguments 612 and 614, return address 616 that points to the calling function, ebp register value 618, and local variable 620.

Based on the assigned secret values, the CPE can generate a representation of an authorized path to a protected function. In some embodiments, the representation of an authorized path can be a combination of the secret values assigned to the function on the authorized path. For example, a combination of the secret values can be a hash of the assigned secret values. To illustrate consider call graph 500 in FIG. 5. Call graph 500 includes two execution paths to protected function D: ($P_1$) A, B, D and ($P_2$) A, C, D. In this example, using a simple xor hash, the representations for the two authorized paths are: $P_1=9$ and $P_2=7$.

Once the CPE has generated a representation for each authorized path on the whitelist, the CPE can construct a polynomial that represents the whitelist for the protected function. The polynomial for a whitelist of a protection function can be of the form $verify(x)=(x-P_1)(x-P_2) \ldots (x-P_n)$, where $P_i$ is a combination of the secret values assigned to the functions on path $P_i$, i.e., the representation of the path. Continuing with the example from FIG. 5, the polynomial for the example whitelist is $verify(x)=(x-9)(x-7)=x^2-16x+63$.

The CPE can then embed a CPE verification mechanism in a protected function to ensure that the execution path is an authorized path. The CPE verification mechanism can use the constructed polynomial at runtime to verify that the sequence of functions executed prior to reaching the protected function is an authorized execution path. The CPE verification mechanism can perform the verification by tracing the runtime stack to identify any secret values pushed onto the stack by previous functions in the execution path.

To enable the CPE verification mechanism to identify the secret values pushed on the runtime stack by previously executed functions, a linked list of secret values can be constructed. The linked list can be made up of nodes containing the assigned secret value and a pointer to a previous node. For example, a node can be based on the following structure:
 struct mySecret {
 int secretData;
 mySecret*prey;}
Instead of using a primitive type, such as an integer, the local variable added to the function can be similar to the structure mySecret above. When the local variable is initialized in a first function on an authorized path, the pointer to the previous node can be set to NULL or some other predefined value. When the first function calls a second function on the authorized path, a pointer to the first secret data node can be passed as an argument to the second function. The second function can then use this pointer to initialize the pointer in the second secret data node. This process can continue each time a new function on an authorized path is executed, thus creating a linked list of secret data nodes stored on the runtime stack.

Figure 7:
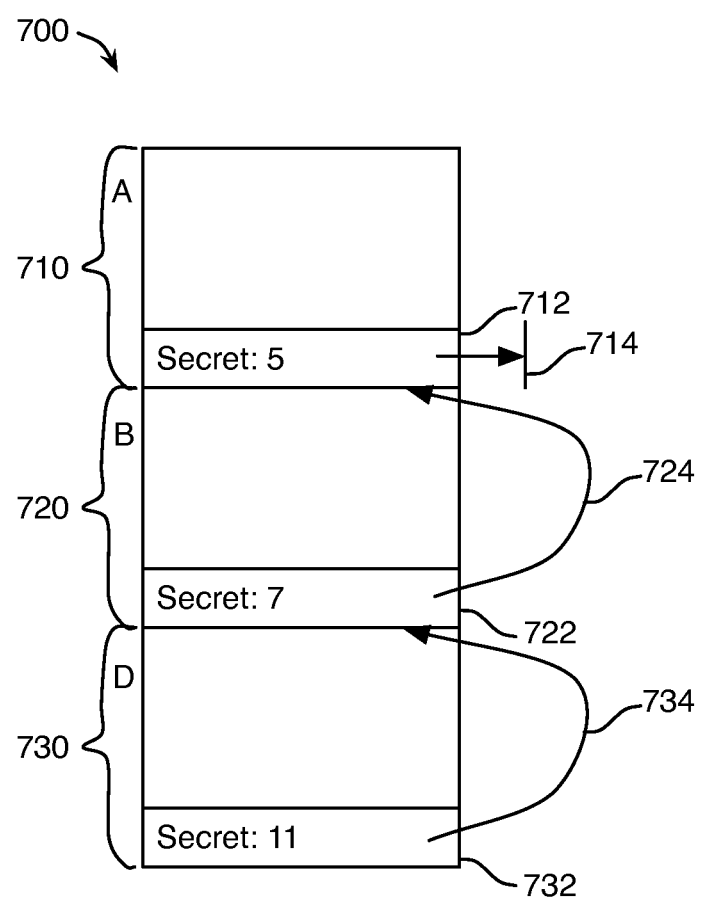
FIG. 7 illustrates a runtime stack based on an authorized execution path.

FIG. 7 illustrates runtime stack 700 based on the authorized execution path A, B, D from FIG. 5. In this example, stack frame 710 with secret data node 712 for function A is initially added to runtime stack 700. Because this is the first function on the authorized path, previous pointer 714 is set to NULL. When function A calls function B, new stack frame 720 with secret data node 722 is added to runtime stack 700. Because function B was called by another function on the authorized path, previous pointer 724 is initialized to point to secret data node 712. Likewise, when function B calls protected function D, new stack frame 730 with secret data node 732 is added to runtime stack 700. Because protected function D was called by another function on the authorized path, previous pointer 734 is initialized to point to secret data node 722.

At runtime, the CPE verification mechanism can trace up the runtime stack using the previous pointers in the secret data nodes. As the CPE verification mechanism traces the runtime stack, the CPE mechanism can collect the assigned secret values. For example, as the CPE verification mechanism traces runtime stack 700, the CPE verification mechanism can identify the set of secret values: {5, 7, 11}. The identified secret values can be combined to generate a representation for the execution path to the protected function. In some cases, the CPE verification mechanism can combine the secret values as the CPE verification mechanism traces up the runtime stack. Alternatively, the CPE verification mechanism can assemble a set of secret values and combine them after completing the full trace.

The CPE verification mechanism is configured to combine the identified secret values using a same process as was used during the CPE obfuscation technique to generate path representations for the authorized paths. For example, if during the obfuscation process, the CPE used a particular hash function to combine the secret values, the CPE verification mechanism is configured with the same hash function. For the authorized paths in FIG. 5, the CPE used a simple xor hash to generate the representation for the two authorized paths to function D. Therefore the CPE verification mechanism can apply an xor hash to the set of secret values, {5, 7, 11}, identified by tracing runtime stack 700 in FIG. 7. By applying the xor hash, the CPE verification mechanism generates a representation for runtime execution path A, B, D of 9.

To verify that the runtime execution path is authorized, the CPE verification mechanism could compare the runtime representation with the representations for the authorized paths. However, such an approach is not ideal from a performance or security perspective. Instead, the CPE verification mechanism can be configured to use the runtime representation as a input to the constructed polynomial, e.g. $verify(x)=(x-9)(x-7)=x^2-16x+63$ from the example in FIG. 5. If the runtime execution path matches an authorized execution path, then the result of using the runtime representation as an input to the constructed polynomial will be 0. For example, using the runtime representation 9 for runtime path A, B, D as input to $verify(x)=(x-9)(x-7)=x^2-16x+63$ produces a verification value of 0 because runtime path A, B, D is an authorized path. However, if an attacker had directly called D, the CPE verification mechanism would have generated a runtime representation of 11. Using this runtime representation would yield a verification value of 8, thus indicating the path to protected function D was not an authorized path.

To complete the verification, the CPE verification mechanism can compare the verification value to the expected result of 0, and then take appropriate action. For example, for a non-matching result, the CPE mechanism could cause the program to exit. Alternatively, the verification value can be used during execution of the program in such a way that execution is proper only when the runtime verification value matches an expected verification value. In some cases, the runtime verification value can be used to manipulate program data. For example, program data could be masked or altered during the obfuscation process by using the expected verification value as an input. If the runtime verification value is incorrect, when the program data is manipulated at runtime, the resulting program data will be incorrect. In some cases, the runtime verification value can be used in the execution of a callback function. For example, the runtime verification value can be used to select a particular callback function or as input to a callback function. If the runtime verification is incorrect, a wrong callback can be selected or execution of a callback may be incorrect.

The CPE verification mechanism can be embedded directly in a protected function, be one or more separate functions called by a protected function, and/or be split between the protected function and one or more separate functions. For example, the protected function can include instructions to trace the runtime stack collecting and/or combining the pushed secret values. The set of collected secret values or the combined secret value can then be passed to a CPE verification mechanism that evaluates the polynomial using the secret value(s).

Figure 8:
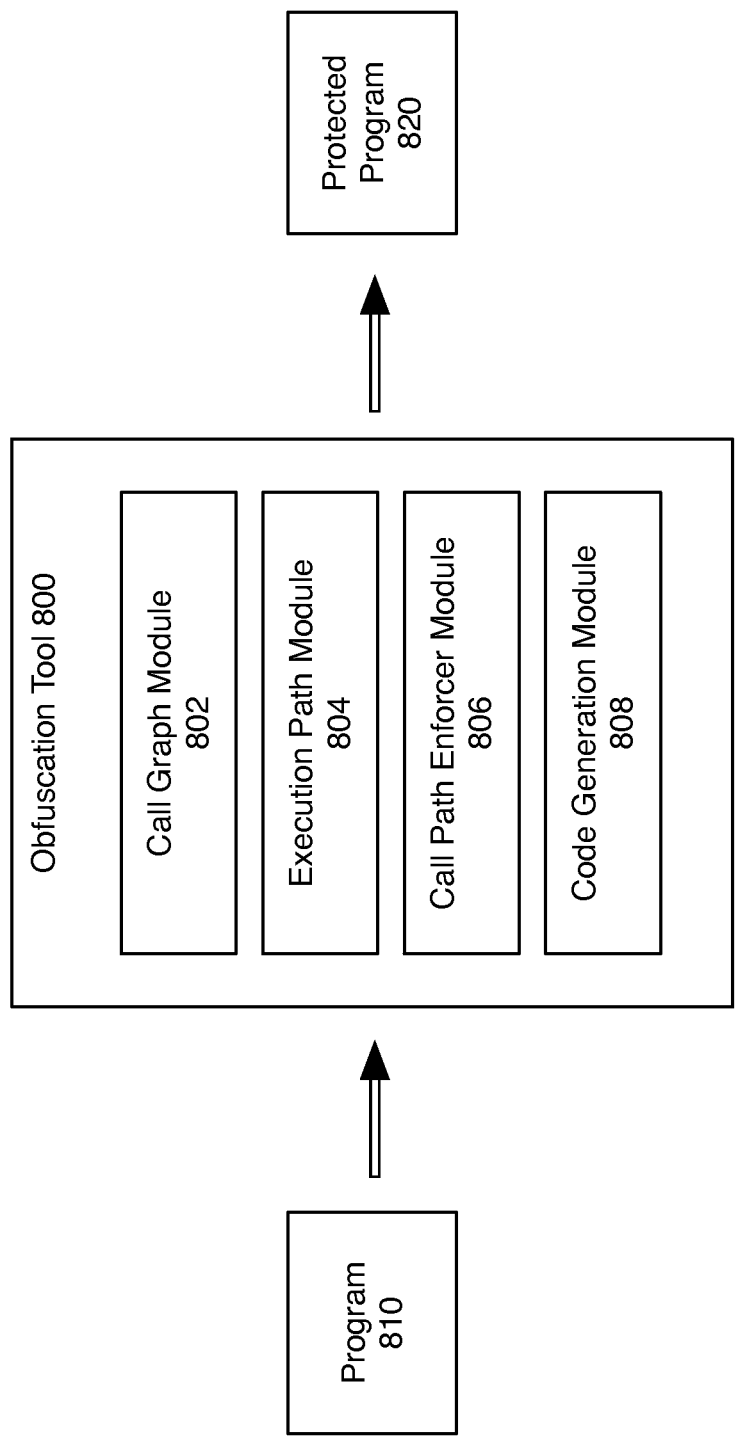
FIG. 8 illustrates an exemplary obfuscation tool.

FIG. 8 illustrates exemplary obfuscation tool 800, such as a compiler or post processing tool running on a processor within a computing device. Obfuscation tool 800 can be configured to embed CPE instructions, including secret values in local variables and a CPE verification mechanism, in a computer program. A computer program can include human-readable source code, compiled machine-executable object code, and/or any other intermediate representations of the source code or compiled code.

Obfuscation tool 800 takes as input program 810, which can be source code, executable code, or an intermediate representation, depending on the configuration of obfuscation tool 800. For example, obfuscation tool 800 can be a compiler that takes source code as input and produces an obfuscated executable program. In another example, obfuscation tool 800 can be a binary rewriting tool that takes an executable program and produces an obfuscated executable program. In still another example, obfuscation tool 800 can be a source code obfuscator that takes source code as input and produces obfuscated source code.

Obfuscation tool 800 can include one or more modules for analyzing input program 810, inserting CPE instructions, and generating an obfuscated program 820, e.g., call graph module 802, execution path module 804, CPE insertion module 806, and code generation module 808. Each of the modules in FIG. 8 is discussed in more detail below; however, it should be understood by one skilled in the art, that the architectural configuration illustrated in FIG. 8 is simply one possible configuration and that other configurations with more or less components is also possible.

Obfuscation tool 800 can include call graph module 802. Call graph module 802 can be configured to construct a call graph for input program 810. Call graph module 802 can generate the call graph based on a static analysis of input program 810. In some cases, call graph module 802 can use standard static analysis techniques for constructing a call graph. However, call graph module 802 can also be configured to identify functions in input program 810 that are called indirectly or have their address taken. When call graph module 802 detects such a function, call graph module 802 can insert a stub function that calls the original function. Additionally, call graph module 802 can replace all instances where the original function's address is taken with the stub function. The result is a call graph where the only functions that have their address taken are root (or entry) functions.

Obfuscation tool 800 can include execution path module 804. Execution path module 804 can be configured to use the call graph constructed by call graph module 802 to identify all or a subset of possible execution paths to a protected function from a root or entry function. Using the identified execution paths, execution path module 804 can construct a whitelist of authorized paths. The whitelist can include all of the identified execution paths or can be restricted to only those execution paths with a path length less than or equal to a predefined maximum path length. In some cases, execution path module 804 can truncate an execution path to the predefined maximum path length. For example, when an execution path includes a call loop or cycle, e.g. a recursive function or a sequence of functions that can repeatedly call each other forming a cycle.

Obfuscation tool 800 can include CPE insertion module 806. CPE insertion module 806 can be configured to insert the CPE instructions, including the secret data local variables and the CPE verification mechanism. CPE insertion module 806 can assign a secret value to each function on at least one authorized execution path. Using the assigned secret values, CPE insertion module 806 can insert a secret data local variable in each of the functions. Furthermore, CPE insertion module 806 can modify the parameter list for the functions on an authorized execution path to include a pointer to a previous secret data local variable.

Additionally, CPE insertion module 806 can use the assigned secret values to generate an execution path representation for each whitelisted execution path. CPE insertion module 806 can then use the set of execution path representations to generate a verification polynomial, which CPE insertion module 806 can incorporate into the CPE verification mechanism and insert in the program. Furthermore, CPE insertion module 806 can incorporate into the CPE verification mechanism runtime stack tracing instructions that identify the secret values pushed onto the runtime stack by previously executed functions. In some cases, CPE insertion module 806 can embed the CPE verification module in a protected function.

Obfuscation tool 800 can include code generation module 808. Code generation module 808 can generate obfuscated program 820. The format of obfuscated program 820 can vary with the configuration of obfuscation tool 800. For example, obfuscated program 820 can be source code, an intermediate representation, machine code, object code, virtual machine code, or some other code executable by a computing device.

Figure 9:
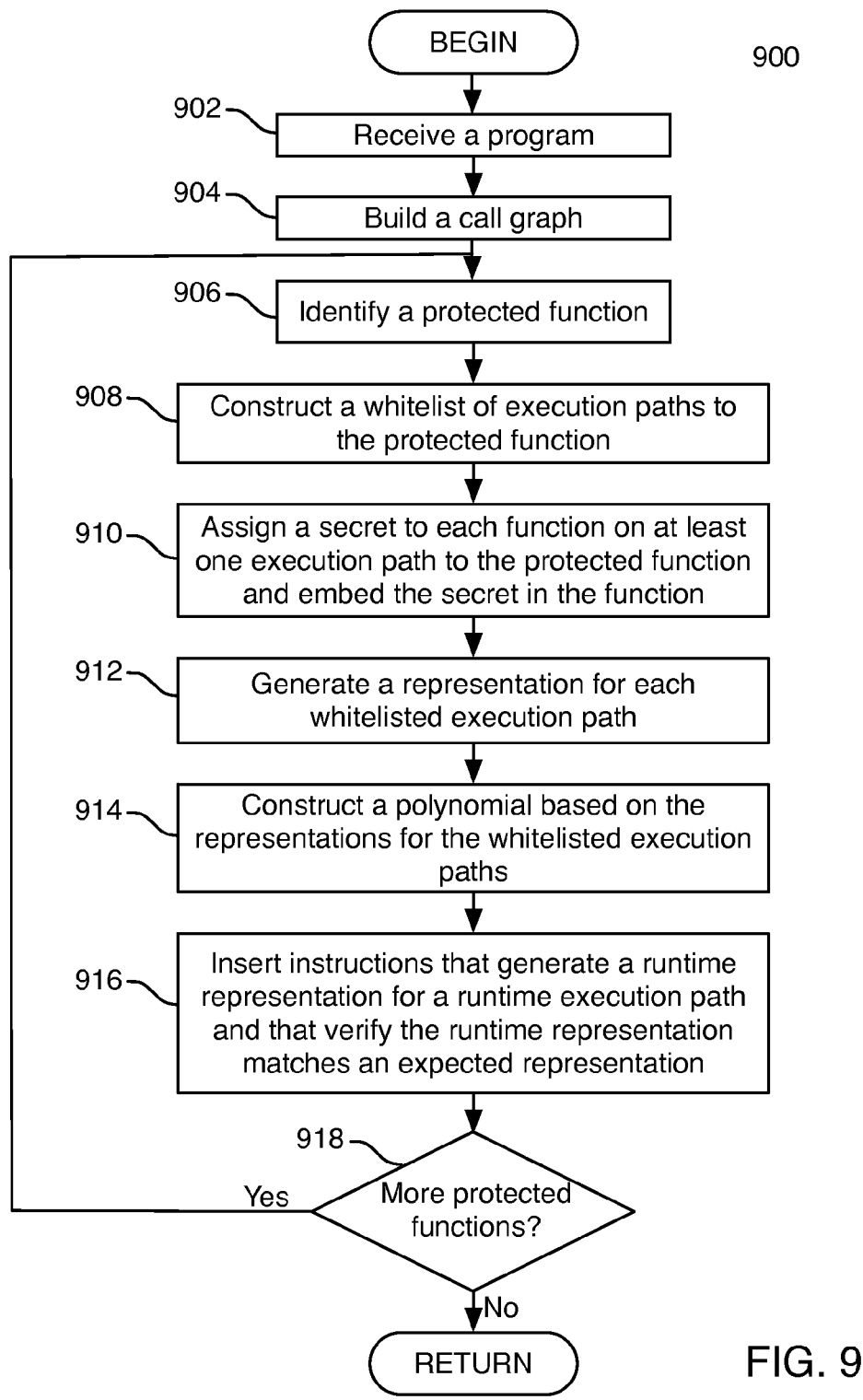
FIG. 9 illustrates an exemplary method embodiment for obfuscating a program using the CPE technique.

FIG. 9 is a flowchart illustrating exemplary method embodiment 900 for obfuscating a program using the CPE technique. For the sake of clarity, this method is discussed in terms of an exemplary obfuscation tool, such as is shown in FIG. 8. Although specific steps are shown in FIG. 9, in other embodiments a method can have more or less steps than shown.

At some point, obfuscation tool 800 receives a program to be obfuscated using the CPE obfuscation technique (902). In addition to the program, obfuscation tool 800 can receive one or more obfuscation parameters, such as a list of one or more functions to protect or one or more obfuscation strength levels. The obfuscation strength level can include a performance level, a complexity level, and/or a security level.

After receiving a program to obfuscate, obfuscation tool 800 can build a call graph (904) representing the static call structure of the program. The call graph can be a traditional static call graph or it can be a modified call graph in which the obfuscation tool has inserted stub functions for those functions identified as being called indirectly or as having their address taken. For example, a function could be assigned to a variable and then the variable could be used to indirectly call the function.

Obfuscation tool 800 can also identify a protected function (906). In some cases, a protected function will be designated via an annotation attached to function. For example, a non-annotated function declaration is void multiply (int x, int y). The same example annotated function declaration can be void _attribute_((annotation_title)) multiple(int x, int y). The annotations can embody or include metadata describing additional obfuscation information, such as an obfuscation strength level. Annotations can also be specified in a separate location from the program code, such as in a separate annotation file with references to the functions. A protected function can also be designated via other mechanisms, such as a command line option. In some cases, obfuscation tool 800 can automatically identify a protected function by selecting any leaf level function in the call graph, a function whose shortest execution path is less than a predefined threshold, or randomly selecting a function until an attribute of the obfuscated program reaches a predefined level, e.g. performance overhead, complexity, and/or security.

After identifying a protected function, obfuscation tool 800 can construct a whitelist of execution paths to the protected function (908). The whitelist can include all execution paths, or only those execution paths with a path length less than or equal to a predefined maximum path length.

Using the whitelist, obfuscation tool 800 can assign a secret to each function on at least one authorized execution path to the protected function and embed the secret in the function (910). In some cases, each function can be assigned a unique secret value. However, obfuscation tool 800 can also be configured to select a secret value from a set of predefined secret values such that the number of secret values is less than the number of unique functions on the whitelisted execution paths. The secret values can be embedded in the functions using a local variable, which will cause the secret values to be pushed onto the stack when the functions are executed.

Obfuscation tool 800 can then generate a representation for each whitelisted execution path (912). Obfuscation tool 800 can construct a representation for an execution path by combining the secret values assigned to the functions on the execution path. For example, obfuscation tool 800 can apply a hash to the secret values to produce a single hash value as the execution path representation.

Using the execution path representations generated for the whitelisted execution paths, obfuscation tool 800 can construct a verification polynomial (914). The verification polynomial can be part of a CPE verification mechanism that is used at runtime to verify that an execution path to the protected function is an authorized execution path.

Obfuscation tool 800 can also insert instructions in the protected function that generate a runtime representation for a runtime execution path to the protected function and verify that the runtime representation matches an expected representation (916). The instructions can include the CPE verification mechanism as well as instructions that trace back up the runtime stack to identify any secret values pushed on the stack by previously execution functions on the execution path.

Obfuscation tool 800 can then check if there are additional protected functions (918). If so, obfuscation tool 800 can proceed to identify a next protected function (906). If no additional protected functions remain, obfuscation tool 800 can resume previous processing, which can include repeating method 900, applying a different obfuscation technique to the CPE protected program, or outputting a protected program.

Figure 10:
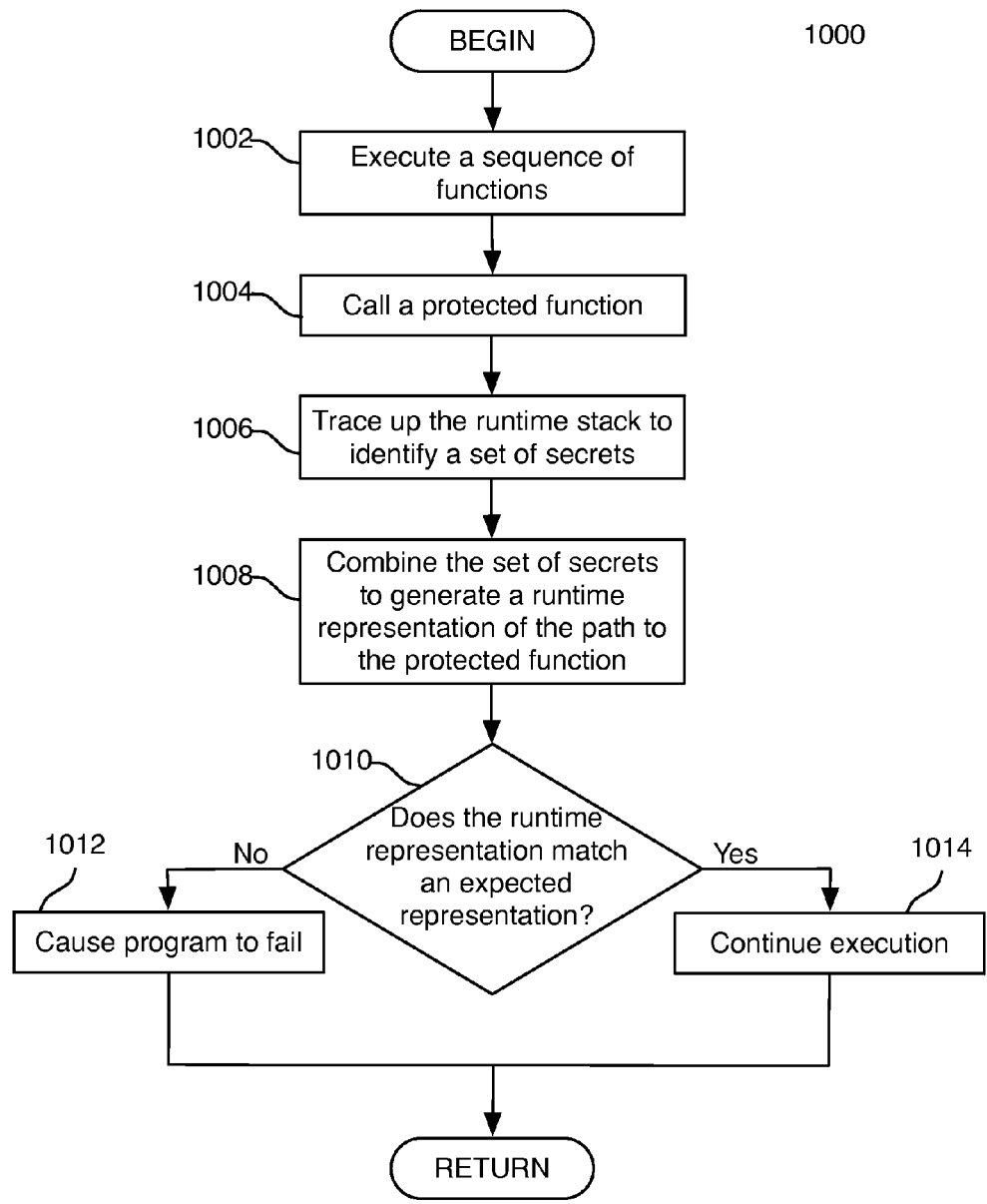
FIG. 10 illustrates an exemplary method embodiment for executing a program obfuscated using the CPE technique.

FIG. 10 is a flowchart illustrating exemplary method embodiment 1000 for executing a program obfuscated using the CPE technique. Although specific steps are shown in FIG. 10, in other embodiments a method can have more or less steps than shown.

A CPE protected program can begin by executing a sequence of functions (1002). The sequence of functions can include one or more functions determined at compile time to be on an authorized path. When a CPE protected program executes an authorized path function, the function can push a secret value on the runtime stack. At some point during the execution, the CPE protected program can call a protected function (1004). After calling the protected function, the CPE protected program can trace up the runtime stack to identify any secret values pushed on the stack by previous functions (1006). For example, the secret values can form a linked list as they are push on to the runtime stack. To trace up the runtime stack, the CPE protected program can follow the pointers in the linked list.

The CPE protected program can combine any identified secret values to generate a representation of the runtime execution path to the protected function (1008). For example, the CPE protected program can combine the secret values by hashing the values as the values are identified on the stack. In another example, the CPE protected program can collect the secret values and after completing the full trace, the CPE protected program can then combine the secret values using a hash.

After generating the representation of the runtime execution path, the CPE protected function can check if the runtime representation matches an expected representation (1010). To verify that the runtime execution path is an authorized execution path, the CPE protected function can evaluate a verification polynomial embedded in the program using the runtime representation as input. If the runtime execution is an authorized execution path, the generated verification value will be 0. If the runtime representation does match the expected representation, the CPE protected function can continue executing (1014). However, if the runtime representation does not match the expected representation, the CPE protected program can fail (1012). In some cases, the failure can occur immediately. For example, by aborting the program as soon as the unauthorized execution path is detected. However, the CPE protected function can also be configured to fail at a later time. For example, the verification value can be used during execution of the program in such a way that execution is proper only when the runtime verification value matches the expected verification value. In some cases, the runtime verification value can be used to manipulate program data, or in the execution of a callback function. In some cases, the failure can cause a termination in the program, or the failure can be less obvious such as by producing erroneous results. After causing a program failure or continuing execution, CPE protected function can resume previous processing, which can include repeating method 1000.

FIG. 11A, and FIG. 11B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method comprising:
identifying a set of function execution paths through a program to a protected function;
generating a polynomial based at least in part on the set of function execution paths; and
embedding, via a processor, instructions throughout the program that allow proper execution of the protected function upon determining that a runtime call order to the protected function matches at least one of the set of function execution paths, the matching determined by evaluating the polynomial using a runtime generated secret corresponding to the runtime call order.

2. The computer implemented method of claim 1, wherein generating a polynomial based at least in part on the set of function execution paths comprises:
for each function associated with at least one execution path in the set of function execution paths, assigning a secret value to the function;
for each execution path in the set of function execution paths, generating a representation of the execution path based on assigned secret values; and
constructing the polynomial using the representations of the execution paths.

3. The computer implemented method of claim 2, wherein generating a representation of an execution path based on assigned secret values comprises:
identifying a set of secrets for the execution path; and
combining the set of secrets to generate an execution path value.

4. The computer implemented method of claim 3, wherein combining the set of secrets comprises hashing together each secret in the set of secrets to produce a hash value.

5. The computer implemented method of claim 2, wherein the secret value is selected from a predefined set of secret values, wherein a number of secret values in the set of secret values being less than a number of unique functions in the set of function execution paths.

6. The computer implemented method of claim 5, wherein the number of secret values is based on at least one of a performance level, a complexity level, or a security level.

7. The computer implemented method of claim 1, wherein identifying a set of function execution paths is based on a call graph for the program.

8. A compiler comprising:
a processor;
a memory having instructions stored thereon which cause the processor to:
receive a computer program having at least one protected function;
generate a call graph for the computer program to identify a set of function execution paths through the computer program to the protected function;
generate a polynomial based at least in part on the set of function execution paths, and
embed instructions throughout the computer program that allow proper execution of the protected function upon determining that a runtime call order to the protected function matches at least one of the set of function execution paths, the matching determined by evaluating the polynomial using a runtime generated secret corresponding to the runtime call order; and
compile the received computer program based on the embedded instructions.

9. The compiler of claim 8, wherein the protected function is designated by an annotation.

10. The compiler of claim 8, wherein the set of function execution paths includes all execution paths to the protected function.

11. The compiler of claim 8, wherein the set of function execution paths includes all execution paths to the protected function with a path length less than or equal to a predefined maximum path length.

12. The compiler of claim 11, wherein a function execution path with a length greater than the predefined maximum path length is truncated to the predefined maximum path length.

13. The compiler of claim 11, wherein the maximum path length is based on an obfuscation strength level.

14. A computer implemented method comprising:
executing, via a processor, a sequence of functions on a path, wherein each function in the sequence of functions pushes a secret onto a runtime stack;
calling a protected function, wherein the protected function executes properly when a runtime call order of the sequence of functions matches at least one authorized path;
tracing up the runtime stack to identify a set of secrets comprising each of the secrets pushed onto the runtime stack by each function in the sequence of functions;
combining the set of secrets to generate a representation of the path to the protected function; and
verifying the representation of the path to the protected function matches the at least one authorized path.

15. The computer implemented method of claim 14, further comprising:
determining that the representation of the path does not match the at least one authorized path; and
in response, causing an execution error that prevents execution of the protected function.

16. The computer implemented method of claim 14, wherein verifying the representation of the path comprises:
evaluating a polynomial based on the representation of the path to the protected function to generate a runtime verification value.

17. The computer implemented method of claim 16 further comprising:
comparing the runtime verification value with an expected verification value.

18. The computer implemented method of claim 16 further comprising:
determining that the runtime verification value matches an expected verification value; and
executing the protected function.

19. A system comprising:
a processor;
a memory having instructions stored thereon which cause the processor to:
insert instructions in computer code wherein the inserted instructions include instructions to:
execute a sequence of functions on a path, wherein each function in the sequence of functions pushes a secret onto a runtime stack;
call a protected function, wherein the protected function executes properly when a runtime call order of the sequence of functions matches at least one authorized path;
trace up the runtime stack to identify a sequence of secrets corresponding to the sequence of functions, the tracing including generating a representation of the path to the protected function by combining together each secret in the sequence of secrets; and
verify the representation of the path to the protected function matches the at least one authorized path.

20. The system of claim 19, wherein combining together each secret in the sequence of secrets comprises hashing together each secret to produce a hash value.

21. The system of claim 19, wherein the secret is stored in a local variable in the function on the path.

22. The system of claim 19, wherein a second secret includes a pointer to a first secret previously pushed onto the runtime stack.

23. The system of claim 22, wherein tracing up the runtime stack comprises repeatedly following a pointer from a second secret to a first secret.

24. The system of claim 19, wherein verifying the representation of the path comprises:
evaluating a polynomial based on the representation of the path to the protected function to generate a runtime verification value;
using the runtime verification value to execute a callback function based on the runtime verification value; and
determining, based on the callback function, that the runtime verification value matches an expected verification value.

25. The system of claim 19, wherein verifying the representation of the path comprises:
evaluating a polynomial based on the representation of the path to the protected function to generate a runtime verification value;
using the runtime verification value during execution by manipulating program data based on the runtime verification value; and
determining that the runtime verification value matches an expected verification value.

* * * * *